No. 635,929. Patented Oct. 31, 1899.
P. S. GRIFFITH.
BICYCLE TIRE.
(Application filed Apr. 3, 1899.)
(No Model.)

Witnesses.
A. W. Joannes.
A. Allgier

Inventor.
Phares. S. Griffith
By Ithiel J. Cilley
Attorney.

THE NORRIS PETERS CO., PHOTO-LITHO., WASHINGTON, D. C.

UNITED STATES PATENT OFFICE.

PHARES S. GRIFFITH, OF GRAND RAPIDS, MICHIGAN, ASSIGNOR OF ONE-THIRD TO ROSE BACHMAN, OF SAME PLACE.

BICYCLE-TIRE.

SPECIFICATION forming part of Letters Patent No. 635,929, dated October 31, 1899.

Application filed April 3, 1899. Serial No. 711,611. (No model.)

*To all whom it may concern:*

Be it known that I, PHARES S. GRIFFITH, a citizen of the United States, residing at Grand Rapids, in the county of Kent and State of Michigan, have invented certain new and useful Improvements in Bicycle-Tires, of which the following is a specification.

My invention relates to improvements in resilient tires for bicycles; and its objects are, first, to produce a light, inexpensive, and highly resilient tire, and, second, to provide a bicycle-tire of the character mentioned with which the resiliency may be controlled at the will of the operator. I attain these objects by the mechanism illustrated in the accompanying drawings, in which—

Figure 1:
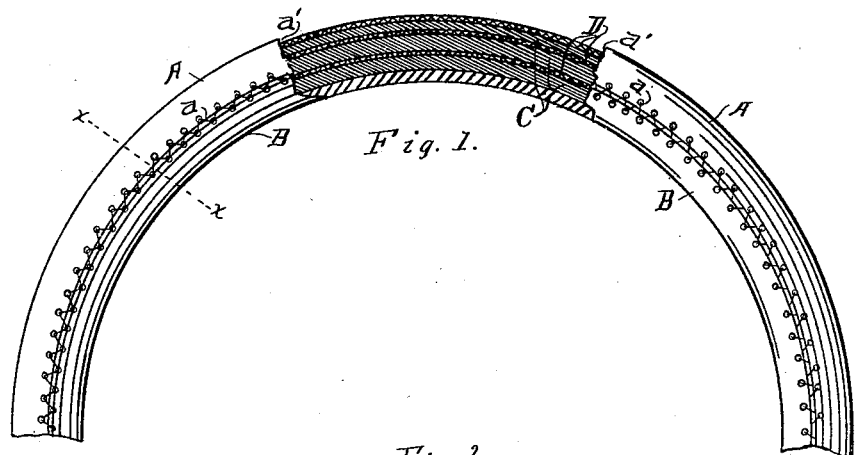
Figure 2:
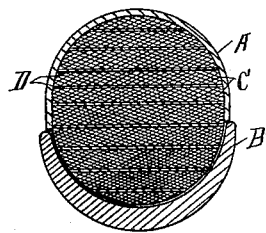
Figure 3:
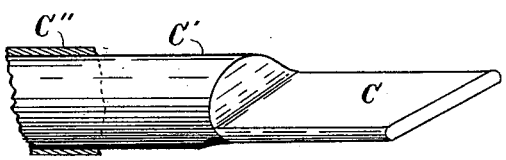
Figure 4:
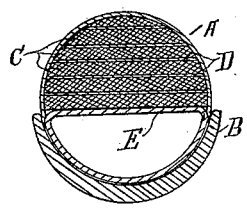

Figure 1 is a section of my tire with a portion cut away at $a^6$ $a^6$ to show the manner of constructing the inner portion of the same. Fig. 2 is a transverse section of the same on the line $x$ $x$ of Fig. 1. Fig. 3 shows the fiber used in filling the tire in its several stages of preparation; and Fig. 4 is a transverse section of a tire, as on the line $x$ $x$ of Fig. 1, showing an air-tube between the filling and the wheel-rim.

Similar letters refer to similar parts throughout the several views.

A represents the outer casing of the tire and is made, preferably, of rubber, though other material—as leather, heavy canvas, &c.—may be used.

B is the wheel-rim, which I prefer to have extend well up at each side of the tire as a support.

C represents a pressed vegetable fiber, as the pith of cornstalks, and D represents a supporting fiber, as heavy canvas or kindred material, which is placed in alternate layers with the pressed fiber in layers running, preferably, circumferential of the tire.

In the preparation of the fiber we will presume that Fig. 3 represents a piece of cornstalk. C" represents the outer shell of the stalk. C' represents the pith with this shell removed, and C represents the pith after having been passed between heavily-pressing rolls to reduce it to as compact a condition as possible. After having passed through between the rollers this pith or fiber is found to possess a great degree of resiliency. In preparing this fiber it is well, though not absolutely necessary, to treat it with a waterproof solution, so that there will be no danger of the introduction of water into the tire, causing the fiber to swell and perhaps lose its resiliency. When properly prepared, I place a layer of this fiber circumferential of the rim and alternate with a layer of canvas, as indicated in Fig. 1, and so continue until the tire is built up to the desired size.

The fiber is secured to the rim or other base and also the fiber and the canvas are secured together with a flexible cement, so that the resiliency of the tire may not be lessened by the use of the cement, and then the fiber is turned to the desired form and the casing A is applied. To apply this casing, I form a series of eyelets, as shown at $a$, in the edge both of the wheel-rim and the casing and lace them together, as indicated in Fig. 1. It will be readily seen that with this construction it is only necessary to cover the outer surface of the tire with the casing, the rim acting as the covering of the inner half of the diameter of the tire, and the lacing enables me to draw the casing as snugly upon the fiber filling as is necessary to warrant the desired resiliency to the tire.

I provide for controlling the degree of resiliency of my tire by placing an air-tube B in the rim back of the fiber in position to act as the base to which the fiber is cemented. This tube is used only in the better or higher-priced grade of my tires, and as it is so far removed from the tread of the tire that it is impossible to puncture it it can be made of a less expensive material than is necessary where the tread of the tire is directly on the tube. As the cheaper preparation of which this tube may be made is likely to be more or less porous, I find it well to place a small quantity of some non-drying semifluid, as glycerin, inside of the tube, so that it may distribute itself over the entire inner surface and close any small punture or pore that may exist, and thus make assurance doubly sure so far as the danger of air escaping is concerned.

Having thus fully described my invention, what I claim as new, and desire to secure by Letters Patent of the United States, is—

1. In combination, a bicycle-tire constructed of alternate layers of vegetable fiber and woven fabric connected with a flexible cement, a wheel-rim, and an outer casing, said rim and casing laced together and forming a protection around the fiber, substantially as and for the purpose set forth.

2. In combination, a wheel-rim, the pith of cornstalk brought under extreme pressure and placed in circumferential layers around the rim, canvas layers between the layers of pith and cemented thereto with a flexible cement, and an outer casing connected with the rim to protect the pith, substantially as and for the purpose set forth.

3. In combination, a concave wheel-rim, a pneumatic tube in the concave of said rim, resilient vegetable fiber and canvas in alternate layers circumferential of said rim, and an outer casing secured at the edges to the edges of the rim to protect the fiber filling, substantially as and for the purpose set forth.

Signed at Grand Rapids, Michigan, March 27, 1899.

PHARES S. GRIFFITH.

In presence of—
ESTELLA CILLEY,
I. J. CILLEY.